Patented Oct. 9, 1945

2,386,381

UNITED STATES PATENT OFFICE 2,386,381

PROCESS OF PRODUCING A PLASTICIZING COMPOSITION

Ralph T. K. Cornwell, Fredericksburg, Va., assignor to Sylvania Industrial Corporation, Fredericksburg, Va., a corporation of Virginia No Drawing. Application September 12, 1942, Serial No. 458,139

6 Claims. (Cl. 195—38)

This invention relates in general to plasticizers for pellicles formed of hydrophilic colloids and in particular to a process of making a plasticizing composition for pellicles formed of hydrophilic colloids and to the plasticizing composition so produced. This application is a continuation-in-part of my co-pending application, Serial No. 430,260, filed February 10, 1942.

Heretofore pellicles formed of hydrophilic colloids, such as Cellophane, have been plasticized with glycerol. However, the commercial uses of glycerol are so varied that its market price frequently fluctuates over a wide range. In view thereof, attempts have been made to provide additional sources of glycerol, such as by fermentation of molasses. The production of glycerol by the fermentation of molasses is, however, subject to many drawbacks from a commercial viewpoint, chief of which is the difficulty of separating and recovering the glycerol in a pure form from the products of fermentation. For example a typical black strap molasses contains fermentable sugars 40 to 48%, unfermentable sugars 5 to 8%, organic colloids (proteins, gums, etc.) 19 to 23%, ash 5 to 8%, and the remainder water. To this complex system there are added nutrient salts and compounds necessary to maintain the pH value. After fermentation, the mixture contains all of the unfermentable matter and in addition the products of fermentation. After fermentation, the product includes glycerol, ethyl alcohol, acetic acid, acetaldehyde, and a tract of fusel oil.

It is obvious therefore that the glycerol must be separated from (a) the inorganic salts, (b) the organic crystalloids including the organic salts and the unfermentable sugars, (c) the organic colloids such as the proteins and gums, and (d) the volatile organic compounds. The separation of the glycerol in a pure form from all of these classes of substances is a tedious, expensive and complicated process. However, since plasticizers for transparent hydrophilic pellicles must be odorless, and colorless, and leave the pellicle non-tacky, it is not possible to use the glycerol mixture obtained by such prior fermentation of molasses without purification.

It is a general object of the present invention to provide a simple and economical method of making a plasticizing composition for hydrophilic colloids.

It is a more specific object of the invention to provide a method of making a plasticizing composition for hydrophilic pellicles by fermentation in a simple and economical manner.

It is another specific object of the invention to obviate the necessity of expensive and complicated methods of separating glycerol from the products of fermentation, as required when glycerol is produced by fermentation of molasses as heretofore practiced.

It is another object to provide a plasticizing composition for hydrophilic pellicles containing fermentation glycerol.

Other objects of the invention will in part be obvious and will in part appear hereinafter.

According to the present invention, a composition for plasticizing hydrophilic pellicles is prepared by fermentation using as the fermentable material molasses or a sugar solution. In carrying out the process, the sugar in such solutions is fermented in a known manner with yeast, in an alkaline medium, maintaining the desired alkalinity thereof by the addition of an excess of a water-soluble alkaline compound which reacts with the acetic acid produced during the fermentation to form a hygroscopic acetate and, after fermentation, the volatile substances, except glycerol, are distilled off and recovered, if desired, and the composition thus remaining, is concentrated and then dialyzed to obtain an aqueous solution of the glycerol and the hygroscopic acetate, which solution, with or without further concentration, is employed for plasticizing articles formed of hydrophilic colloids.

For the fermentable materials there are used fermentable sugars such, for example, as molasses derived from cane, beet, corn, or by the hydrolysis of starch. There is preferably used a high-grade or partially purified molasses comprising about 75%–80% fermentable sugars, substantially no unfermentable sugars or colloids and ash about 1.5–3%. The molasses is preferably fermented in the form of a dilute solution containing, for example, from 15 to 20% by weight of sugar. To the dilute molasses or sugar solution suitable nutrient salts may be added to promote the growth and acivity of the yeast. By way of example, there may be used such nutrient salts as ammonium chloride, ammonium sulfate, ammonium phosphate, magnesium phosphate, and the like. For the fermentation of the sugar solution, there may be employed any suitable yeast, such, for example, as the yeast S. ellipsoideus (variety Steinberg) as shown in U. S. Patent No. 1,288,398, or the yeast No. 16 as disclosed in the McDermott U. S. Patent No. 1,551,997, or any other suitable culture. The yeast is preferably acclimated to the growth in the sugar by starting the yeast growth in a very dilute sugar solution and then transferring the culture to more concentrated solutions of the sugar until the yeast shows an active metabolism in an aqueous solution of from 15 to 20% by weight of sugar.

During the process of fermentation the pH of the solution is maintained preferably between 7 and 8.5 by the addition of a water-soluble compound giving an alkaline reaction in aqueous solution. Although water-soluble alkaline compounds as a class may be used to maintain the pH, there is employed in the now preferred embodiment an alkaline compound which by reaction with the acetic acid produced during the fermentation will produce a water-soluble acetate having hygroscopic properties. The alkaline compounds used are those which are non-toxic to the yeast. Alkaline compounds for this purpose comprise as a class the water-soluble inorganic alkaline compounds which give an alkaline reaction in aqueous solution, such, for example, as potassium carbonate, potassium hydroxide, sodium carbonate, ammonium carbonate, ammonium hydroxide, and the water-soluble organic bases as a class, such, for example as quaternary ammonium bases, alkyl amines and hydroxyalkyl amines and the like, all of which compounds are characterized by being water-soluble, alkaline in reaction, and by reacting with acetic acid to form hygroscopic acetates. Preferably the acetates produced should be deliquescent salts such, for example, as potassium acetate, ammonium acetate, the ethanolamine acetates and the like, since such salts give better results in softening hydrophilic pellicles.

It has been found that such acetates, in particular, potassium acetate, form excellent plasticizers for pellicles formed of hydrophilic colloids so that the presence of these acetates in the fermentation product is functionally important and, in accordance with the present invention, they are not removed from the products of fermentation.

Therefore, in the now preferred practice there is added to the molasses solution potassium carbonate (alone or in admixture with potassium actate) in an amount sufficient to neutralize the acetic acid formed during fermentation. Preferably, the alkaline compound is used in excess because this appears to increase the production of glycerol. After fermentation the excess may be neutralized with acetic acid. In the presence of the excess of the alkaline compound, the pH rapidly drops during fermentation to about 7.4 and remains at that value.

In the now-preferred embodiment of the composition the ratio of hygroscopic acetate compound to the glycerol should be within the range from 1:2 to 1:3. If the amount of acetic acid produced during fermentation is not sufficient to bring the ratio within the range indicated, the invention contemplates that a suitable quantity of a hygroscopic acetate may be added to the product of fermentation.

The fermentation of the sugar solution may be carried out at any suitable temperature at which the yeast cells show sufficient activity, but in the now preferred embodiment the process is carried out at a temperature of from 30 to 40° C.

After the fermentation process has been completed the fermented product will contain glycerol, ethyl alcohol, the water-soluble acetate, a trace of acetaldehyde, a trace of fusel oil, and a trace of the nutrient salts and unfermented sugar. When a 20% sugar solution has been fermented, the liquid before distillation of the alcohol comprises, for example, glycerol from 4% to 6%, water-soluble acetate from 1% to 2%, and a trace of unfermented sugar and nutrient salts, and the remainder is water. The fermented solution is preferably rendered acid, for example, by adding acetic acid until the pH lies between 5.5 and 6.5 and the alcohol is then distilled off and recovered in a known manner. An acid condition of the solution during distillation is desirable to avoid the production of ammonia and because the stills used are normally made of copper.

This "plasticizing composition" thus produced may then be used for plasticizing articles formed of hydrophilic colloids. However, as the solution thus produced is dilute, the liquid, freed from alcohol, is preferably concentrated to about one-half its volume and fresh molasses added thereto to give a sugar content of about 20% and this mixture is refermented. For refermentation additional potassium carbonate is added if necessary to neutralize the acetic acid produced in the second fermentation and to render the solution slightly alkaline. After the second fermentation, the solution is again rendered acid as above described and the alcohol again distilled off and the solution again concentrated to about 50% of its initial volume. During such distillation, the yeast is killed by the heat. When the final solution is to be dialyzed before use, the presence of the yeast is not objectionable since it does not pass through the dialyzing membrane. When dialysis is not to be employed, the yeast is preferably separated from the glycerol solution by suitable means, such as by filtration. The resulting solution contains, as the essential plasticizers, glycerol and potassium acetate, but it also contains certain colloids and inorganic impurities. Further, when derived from cane molasses, the solution has a black color.

The concentrated solution may be purified and decolorized by suitable chemical or physical treatment. For example, the solution may be separated from the yeast and other colloids by dialysis for which one may use a parchment paper or a non-fibrous membrane such, for example, as regenerated cellulose, with water running counter current to the fermented liquor on the opposite side of the membrane. These membranes may be used in the form of tubes or sheets. The glycerol and potassium acetate, with other water-soluble salts, pass through the membrane into the water. If dialysis is not desired, chemical methods of removing the undesired constituents may be resorted to. For example, iron may be removed from the solution by treatment with oxalic acid. Further, the solution may be clarified by precipitating aluminum hydroxide in situ, which precipitate is allowed to settle and the liquid decanted and/or filtered. The precipitate of aluminum hydroxide tends to remove a substantial amount of the color and various insoluble ingredients. Alternatively, albumin and the tannin may be added to the solution and precipitated with formaldehyde to carry down a substantial amount of the impurities and coloring matter.

When the original solution employed or the solution produced has an objectionable color, the original sugar solution or the fermented liquor may be decolorized by suitable means, such for example as by passing it through activated carbon, silica gel or Activated Alumina. However, when the solution contains colloidal coloring matter which is difficult to remove by such absorbents, the solution is preferably dialyzed first to remove such objectionable coloring matter and then decolorized by such absorbents.

It is to be understood that to the plasticizing composition of the present invention there may be added known plasticizers for hydrophilic colloids, such for example as additional glycerol, a glycol, ethylene glycol, diethylene glycol, an alkylol amine, or its water-soluble salt, sorbitol, urea, and the like.

The plasticizing composition thus produced is adapted for plasticizing hydrophilic colloids as a class in the form of pellicles, filaments, tubes, bands and capsules. For example, the composition may be used to plasticize regenerated cellulose, gelatine, casein, hydrophilic cellulose ethers as a class, such for example as alkyl cellulose ethers, hydroxyalkyl cellulose ethers, carboxy-alkyl cellulose ethers, mixed cellulose ethers, water-swelling cellulose esters as a class, water-swelling synthetic resins as a class, leather, glassine, paper, and the like.

The plasticizing composition produced according to this invention is particularly adapted for use in softening and plasticizing regenerated cellulose pellicles in the production of Cellophane. The regenerated cellulose sheet in the wet gel state is passed through a bath containing the plasticizing composition, the concentration of the composition being so adjusted that the mixture of glycerol and water-soluble acetate comprises from 3.5 to 5% by weight of the bath at 40° C. Such a bath is suitable for making Cellophane of #300 weight. For plasticizing heavier Cellophane, the concentration is adjusted in accordance with the known practice in the art.

By way of illustrating but not by way of limiting the invention, there will be given the following detailed example:

An aqueous solution of cane molasses containing 20% by weight of fermentable sugar, is adjusted to a pH of between 7 and 8 by the addition of from 4% to 5% potassium carbonate. A nutrient solution containing a mixture of calcium hydrogen phosphate, ammonium dihydrogen phosphate or urea and concentrated yeast extract is added. To this solution there is added a suitable yeast culture and the solution fermented at a temperature of 35° C. During fermentation the potassium carbonate neutralizes the acetic acid produced, but the excess carbonate maintains the pH at about 7.4. After fermentation, the pH of the solution is adjusted to a value of 5.5 to 6.5 by the addition of acetic acid. The solution is then distilled and the alcohol recovered. The resulting solution is then concentrated to one-half its initial volume, and fresh molasses is added to give a solution containing about 20% sugar and the fermentation repeated with additional yeast under the initial conditions. After the second fermentation, the solution is again acidified with acetic acid and the alcohol again distilled off and recovered. These operations are repeated until the desired concentration of glycerol has been obtained in the solution. When fermentation is apparently completed, the yeast may be separated from the liquid by filtration. The final solution is dialyzed through a membrane of regenerated cellulose and the glycerol content adjusted to from 3.5 to 5% by weight, whereupon the solution will contain also from 1 to 2.5% potassium acetate. This composition may be used at 40° C. for plasticizing regenerated cellulose in the wet gel state of the weight required for making #300 Cellophane.

It is to be understood that the volatile substances need not be separated from the fermented liquor and such substances may remain in the solution when it is employed for plasticizing the hydrophilic colloid.

While the invention has particular application to the production of plasticizing compositions for hydrophilic colloids, the composition has many other uses and, if desired, the glycerol may be separated from the composition by distillation and utilized for many purposes.

In the appended claims, the expression "sugar solution" is intended to include molasses solutions per se as well as solutions of sugar derived from the partial refining of crude molasses and solutions obtained by the dialysis of molasses, as a result of which operations the organic colloids, such as the proteins, gums, etc., are separated from the sugar solution.

While a process and composition for plasticizing a hydrophilic colloid and the plasticized product so produced are disclosed in this application, no claims are made to such subject matter herein since that subject matter is claimed in my co-pending application, Serial No. 430,260, filed February 10, 1942.

Since certain changes in carrying out the above process and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. A process of producing a plasticizing composition comprising fermenting a fermentable sugar solution to glycerol and acetic acid by means of yeast, maintaining the solution alkaline by the addition of a water-soluble alkaline compound which is adapted to react with the acetic acid to form a hygroscopic acetate, and separating the glycerol and said acetate from the fermented liquor by dialysis.

2. A process of producing a plasticizing composition comprising adding yeast to an aqueous alkaline solution comprising a fermentable sugar, fermenting the sugar solution to glycerol whereupon some alcohol and acetic acid are simultaneously produced, maintaining the solution alkaline by the addition of a water-soluble alkaline compound which is adapted to react with the acetic acid to form a hygroscopic acetate, distilling off the alcohol from said liquor and separating the glycerol and said acetate from the fermented liquor by dialysis.

3. A process of producing a plasticizing composition comprising fermenting molasses containing a fermentable sugar to glycerol and acetic acid with yeast, maintaining the molasses solution alkaline by the addition of a water-soluble alkaline compound which is adapted to react with the acetic acid resulting from the fermentation to form a hygroscopic acetate, rendering the solution acid after fermentation, distilling volatile substances from the fermented liquor without distilling the glycerol therefrom, and dialyzing said fermented liquor to obtain a solution of the glycerol and said acetate.

4. A process of producing a plasticizing composition comprising fermenting a fermentable sugar solution to glycerol and acetic acid with yeast while maintaining the liquid alkaline by the addition of an alkaline potassium compound which is adapted to react with the acetic acid resulting from the fermentation to form a hygroscopic acetate, distilling volatile substances from the fermented liquor without distilling glycerol therefrom, and dialyzing said fermented liquor to obtain a solution of the glycerol and said acetate.

5. A process of producing a plasticizing composition comprising preparing an aqueous solution comprising a fermentable sugar, yeast and nutrient salts for said yeast, fermenting said solution while alkaline to give alcohol, acetic acid and glycerol, maintaining the liquid alkaline during fermentation by adding a water-soluble alkaline compound which, by reaction with the acetic acid produced, will give a hygroscopic acetate having hygroscopic properties, distilling the yeast and the alcohol from the fermented liquor, concentrating the residue, repeating the fermentation, distillation and concentration until the desired glycerol content is obtained and dialyzing the fermented liquor to obtain an aqueous solution comprising glycerol and said acetate.

6. A process of producing a plasticizing composition comprising fermenting an aqueous alkaline solution comprising a fermentable sugar, yeast and nutrient salts for said yeast to give alcohol, acetic acid and glycerol, maintaining the solution alkaline during fermentation by carrying out the fermentation in the presence of an excess of a water-soluble alkaline compound which, by reaction with the acetic acid produced, will give a water-soluble acetate having hygroscopic properties, distilling the alcohol from the fermented liquor, concentrating the residue, repeating the fermentation, distillation and concentration until the desired glycerol content is obtained, and dialyzing the fermented liquor to obtain an aqueous solution containing glycerol and said acetate.

RALPH T. K. CORNWELL.